United States Patent [19]
Avellar et al.

[11] 3,720,866
[45] March 13, 1973

[54] METHOD AND SYSTEM FOR DETERMINATION OF ROTOR ANGLE OF SYNCHROMECHANISM

[75] Inventors: Karl B. Avellar, Ellicott City, Md.; James E. Buchanan, Bowie, Ohio; Edward R. Higgins, North Linthicum, Md.

[73] Assignee: Westinghouse Electric Corporation, Pittsburgh, Pa.

[22] Filed: Feb. 2, 1972

[21] Appl. No.: 222,764

[52] U.S. Cl. ............... 318/654, 235/186, 235/189
[51] Int. Cl. ............................................. G05b 1/06
[58] Field of Search ...... 318/654; 235/186, 189, 190, 235/191

[56] References Cited

UNITED STATES PATENTS

| | | | |
|---|---|---|---|
| 3,612,977 | 10/1971 | Perrett | 318/654 |
| 3,646,337 | 2/1972 | Bifulco | 318/654 X |
| 3,648,042 | 3/1972 | Perrett | 235/186 X |

Primary Examiner—Benjamin Dobeck
Attorney—F. H. Henson et al.

[57] ABSTRACT

Synchromechanism outputs in alternating current (AC) waveform are processed by signal conditioning and integrating circuitry, converted from analog voltages to digital amplitude equivalents, and supplied as inputs to a digital processor. High accuracy in the conversion of synchro output to digital representation of synchro angle or position is achieved by a unique computation on the converted synchro output such that common forms of electrical noise which normally limit accuracy are canceled in the computation process. Further, techniques in signal integration and end-to-end circuitry calibration are employed in a compatible manner to enhance the inherent advantages of digital processing. The synchro to digital conversion scheme accommodates variations in signal processing to meet requirements of speed, accuracy and cost.

16 Claims, 7 Drawing Figures

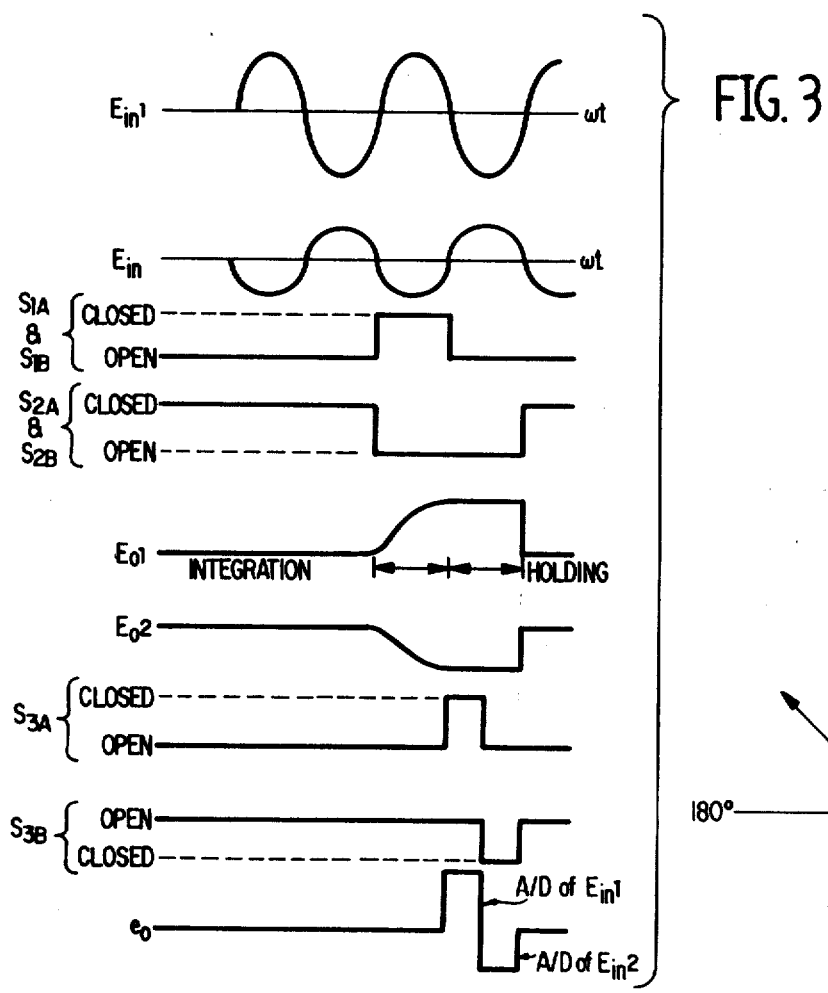
FIG. 3
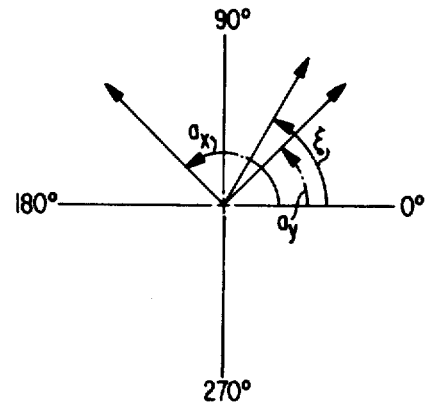
FIG. 6
FIG. 5
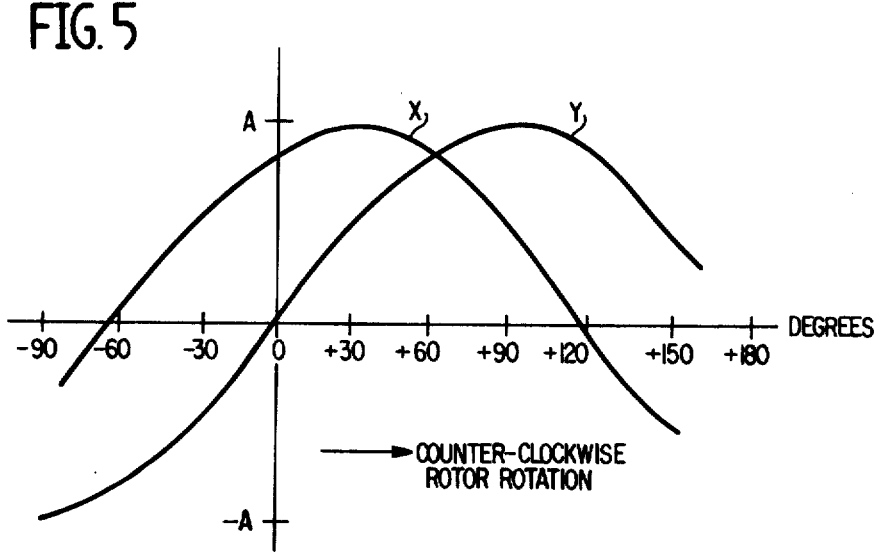

METHOD AND SYSTEM FOR DETERMINATION OF ROTOR ANGLE OF SYNCHROMECHANISM

BACKGROUND OF THE INVENTION

1. Field of the Invention

This invention relates to the processing of synchromechanism signal outputs employing both analog and digital techniques with computations performed by a digital processor.

2. State of the Prior Art

Systems employing synchromechanisms with AC analog voltage output require analog to digital conversion in order to permit digital processing in the determination of synchro angle or position. In prior art conversion systems, each of the two or more synchro outputs is converted from analog to digital form, providing digital numbers corresponding to the analog amplitudes of the synchro outputs. Since the amplitude relationship among the synchro outputs is unique for a given synchro shaft position or angle relative to a reference, simple trigonometric relationships are solved to yield the angle. In practice, the individual synchro signals are distorted due to electrical noise, non-sine wave excitation drive to the synchro, and non-linearities in the signal processing circuitry. Calibration techniques have been developed for reducing these and other effects of circuitry non-linearities, but noise and distortion limit the accuracy with which the measurement of synchro angle or position has heretofore been achieved with a digital processor. Only at increased expense and complication of circuitry could accuracies better than 0.05 percent be realized in prior art systems.

Concerning speed of conversion in terms of time to compute the synchro angle, prior techniques first demodulate and filter, or just filter, the synchro AC output signals and then convert the resulting direct current (DC) voltage to a digital equivalent of magnitude. To achieve high accuracy, ripple in the DC voltage must be reduced to less than 0.1 percent of signal amplitude; however, techniques for ripple reduction impose an undesirable time delay in the conversion process. For applications where the synchro output signals are changing rapidly in amplitude, in accordance with relatively rapid rates of synchro shaft rotation, time delays equal only to even a few cycles of the synchro excitation frequency are prohibitive. The consequence therefore has been decreased accuracy with increases in conversion speed.

This defect in particular is overcome by the conversion technique of the present invention, which is operable to permit conversions in less than one-half a cycle of the excitation frequency while still attaining significant noise rejection and high accuracy.

SUMMARY OF THE INVENTION

In accordance with the present invention, analog and digital circuitry processes synchromechanism output voltages to derive from the trigonometric relationships of the output voltage amplitudes as converted to digital number equivalents, the synchro angle, or position. Each synchro output voltage is a time varying waveform, the frequency of which is established by the AC reference excitation voltage and the amplitude and phase of which are determined by the geometric relationship of windings within the structure of the synchro and, in particular, the angular position of the AC reference winding of the rotor with respect to the individual output windings of the stator.

Each output signal first is processed by analog circuitry to obtain a voltage amplitude which then is sampled at specified time intervals for conversion to digital number values for digital processing. A convenient time reference for a sample interval is the period of the AC reference excitation voltage. For each cycle of the AC reference voltage, each synchro output voltage is cyclical and of the same period as the reference, but differs in amplitude from a possible zero voltage to a maximum voltage in accordance with the winding ratio, or transformer properties, of the synchro. The phase relationships of synchro output cycles to the AC reference cycles are either in phase, corresponding to half the possible alignment positions of rotor and stator, or 180° out of phase for the other half of the possible alignment positions. During a sample time equal to or less than one-half a cycle of the AC reference voltage, each synchro output voltage will comprise a positive, a negative, or a zero amplitude, varying in accordance with the synchro angular position.

The geometry of the synchro construction is known, whereby amplitude and phase relationships between output voltages can be used in the calculation of synchro angular position. The invention employs a particular choice of trigonometric relationships in the synchro output voltages, such that interference in the output voltages originating from noise common to all outputs, as well as from distortions in the AC reference voltage itself, can be canceled, yielding an accurate measurement of true synchro voltages. To aid further in the elimination of measurement errors, calibration techniques are employed to set the amplitude gain of the analog circuitry such that the digital number derived for each synchro output is highly accurate. The conversion technique of the invention can determine the angular position of a synchro to an accuracy of at least 0.05 percent. Furthermore, the highly accurate conversion is made within one-half cycle or less of the AC reference frequency.

The speed of a digital processor therefore is used to maximum advantage in calculating the angular position of a synchro. Changes in synchro position can be measured from cycle to cycle of the AC reference frequency, while realizing the full accuracy of the technique. This capability alone represents a significant advancement in the state of the art. To further enhance the accuracy of the technique while again utilizing the speed of the digital processor, periodic calibration is performed on amplifying and converting elements on an end-to-end basis.

BRIEF DESCRIPTION OF THE DRAWINGS

FIG. 3 shows voltage and gating waveforms occurring in the analog processing.

FIG. 5 illustrates synchro output amplitude and phase relationships.

FIG. 6 depicts the vector angle relationships between synchro rotor angle and stator windings.

DETAILED DESCRIPTION OF THE INVENTION

Figure 1:
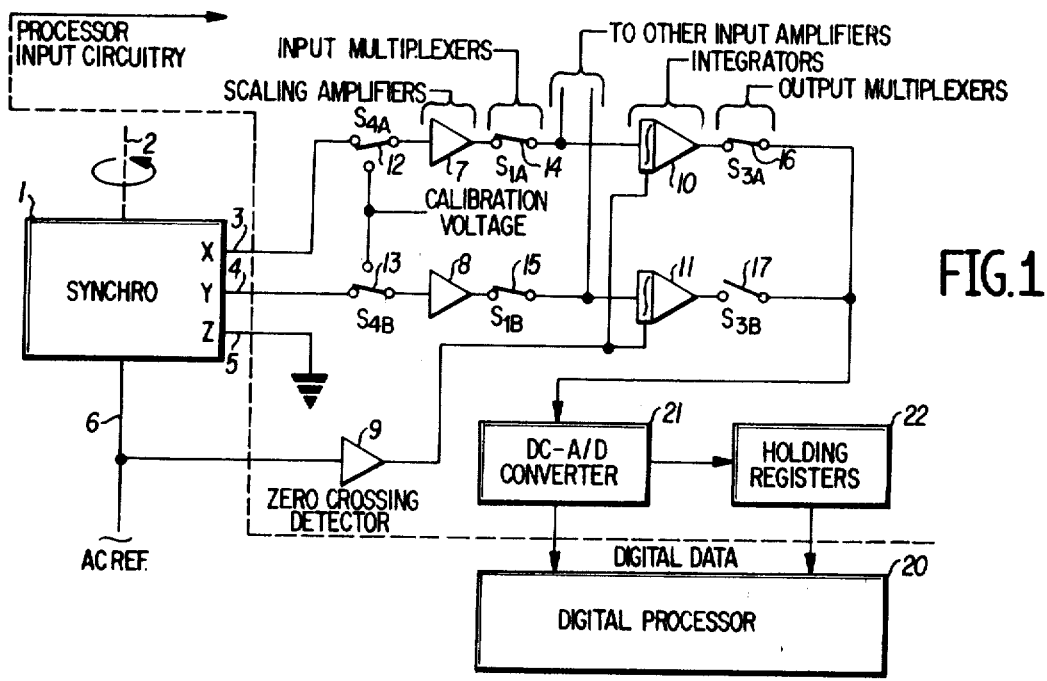
FIG. 1 is a block diagram of the synchro output to digital conversion system of the invention.

With reference to the drawings and FIG. 1 in particular, a specific implementation of the invention is presented. Synchro 1 receives AC reference voltage 6 which is characterized herein as a sine wave of amplitude A and frequency wt. Synchro rotor 2 is shown schematically to rotate; according to the principles of a three output synchro, there are produced output voltages X on lead 3, Y on lead 4, and Z on lead 5. Voltage Z is chosen to be a common voltage point and lead 5 therefore is shown schematically as connected to system ground. Voltages X and Y, relative to Z and hence to ground, are proportional to the rotor's position which, in turn, corresponds to an angular position. Voltage X is amplified by amplifier 7 and voltage Y is amplified by amplifier 8 such that the maximum voltages related to synchro outputs X and Y are properly scaled to the voltage requirements of subsequent circuit elements. Amplifier 9 serves as a zero crossing detector such that its output is discrete in nature, the amplifier 9 functioning to turn on or off precisely at the time that the AC reference sine wave voltage passes through zero volts.

Switch elements S4A and S4B, also labeled 12 and 13 respectively, are associated with an end-to-end calibration technique, wherein a known calibration voltage periodically is applied as an input to each of buffer amplifiers 7 and 8. At each such calibration time the digital processor 20 is programmed to measure the linear amplification of the series circuit elements. This is achieved simply by dividing the voltage input to the processor by the known calibration voltage. Switch elements S1A, S1B, S3A, and S3B, also labeled as 14, 15, 16, 17, respectively, are associated with multiplexing functions which may be employed herein, and will be discussed subsequently.

Figure 2:
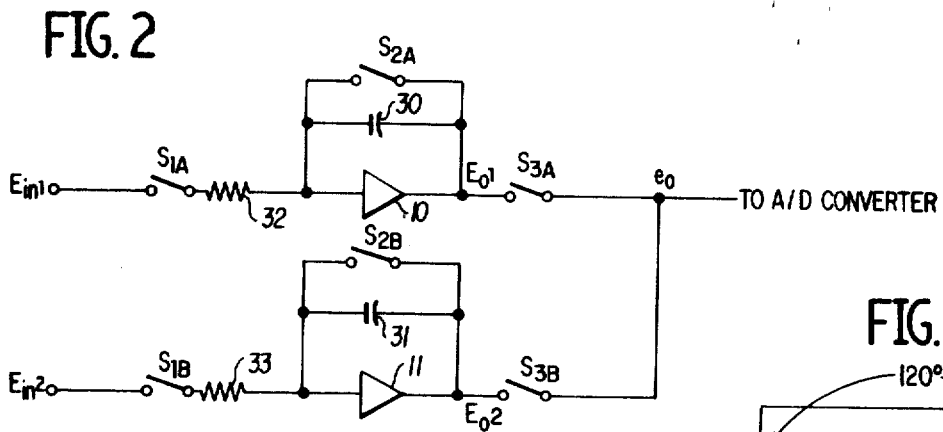
FIG. 2 is a detailed circuit of the integrator element and multiplex switching.

Integrating amplifiers 10 and 11 receive amplified voltages X and Y, respectively, as inputs, the time duration of integration of each being determined by the discrete output of detector 9. The functioning of this part of the circuit is more clearly understood in FIG. 2. Integrators 10 and 11 are shown illustratively as comprising operational amplifiers with RC time constant circuits of capacitors 30 and 31 and resistors 32 and 33, respectively. In operation, for example, with switch S2A closed, amplifier 10 can have only near zero gain and, hence, output voltage $E_o1$ is near zero. The same observations apply as to $E_{in}2$ and $E_o2$.

With switch S2A open, however, capacitor 30 becomes functional in the circuit, in association with resistive element 32, whereby the amplifier 10 integrates the input voltage $E_{in}1$. In practice, the closing of switches S1 and S2 is controlled by the output of the zero crossing detector 9, causing the integrator to function on only a selected portion of the input voltage. Switches S3A and S3B are provided to permit selection of the integrator outputs, whereby the A/D converter 21 may process both integrator outputs in sequential time multiplexed fashion.

The aforediscussed circuit functions may be visualized more readily from the waveforms of FIG. 3. Switches S1A and S1B gate $E_{in}1$ and $E_{in}2$ respectively to integrators 10 and 11. The gating-on time is shown to coincide with the positive one-half cycle of the input sine wave. Integration is shown to be enabled, by the opening of switches S2A and S2B, for nearly a full cycle of input, more precisely, the interval for integrating initiates with the first zero crossing of the sine wave in the positive-going direction, and persists past the time of one-half a cycle only for so long as is required by the output circuit switching time. The integrators 10 and 11 operate to hold, or maintain, their respective output voltages, which then are gated, sequentially, by output voltage switches S3A and S3B to the A/D converter 21 shown in FIG. 21. Upon completion of the A/D conversion, switches S2A and S2B are closed, under control of the processor 20, to reduce the integrator output voltage to zero and prepare the integrator for receiving an input on the next cycle of $E_{in}1$ and $E_{in}2$, respectively.

Integration of one-half cycle of a sine wave is expressed mathematically as:

$$\int_0^\pi A \sin wt = \left[\frac{-A \cos wt}{w}\right]_0^\pi = \frac{-A(-1-1)}{w} = \frac{2A}{w} \quad (1)$$

showing that a non-alternating voltage results where A is the amplitude of the input sine wave and $w = (2\pi)$x frequency, i.e., a radian measure of frequency.

To further illustrate the case where rotor position is such that voltages X and Y are 180° out of phase, $E_{in}2$ would be integrated to yield a negative non-alternating voltage $E_o2$. Mathematically, this corresponds to the more general expression of:

$$\int_0^\pi A \sin (wt+\phi) = \pm\frac{2A}{w} \quad (2)$$

where $\phi$ is either 0° or 180°, causing the sign reversal. In FIG. 3, of course, $E_{in}1$ and $E_{in}2$ could be in phase although for the more general case, are shown as 180° out of phase.

Figure 4:
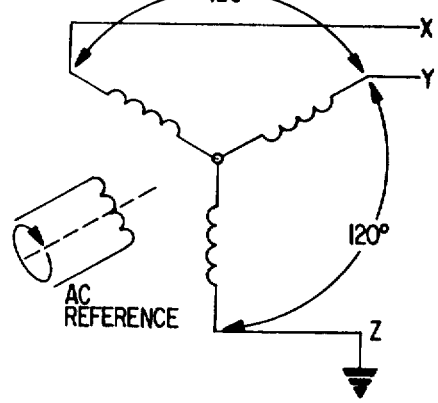
FIG. 4 diagrams a typical three wire synchro circuit.

The geometry of a three output synchro is shown, typically, as in FIG. 4. Each of the three windings, yielding output voltages X, Y and Z, is displaced 120° relative to the others. Note that the rotor can assume any angular position from 0° to 360°. The voltage output relationship between any pair of outputs, such as X and Y, therefore can be plotted as in FIG. 5. Herein, the zero degree axis is selected to coincide with the zero voltage crossing of the waveform of signal Y.

Returning now to FIG. 1, the outputs of integrators 10 and 11, as selected by switches S3A and S3B, are converted from analog to digital form in converter 21 and held temporarily in holding register 22 for input to the digital processor 20.

The digital processor 20 may be a state of the art arithmetic and computational unit which solves for the synchro angle employing the digital numbers presented, time multiplexed, at the holding register 22. Significant operations in the digital processor are:

1. Calculation of synchro angle;
2. Measurement of amplifier gains during calibration; and
3. Correction of calculated synchro angle based on calibration.

Calculation of synchro angle is based on the following equations:

$$X_t = K \sin (\mu + a_x) \quad (3)$$

$$Y_t = K \sin (\mu + a_y) \quad (4)$$

where $X_s$ = the scaled digitized amplitude X after integration;

$Y_s$ = the scaled digitized amplitude Y after integration;

$K$ = an amplitude factor;

$\mu$ = the angular position of the synchro rotor;

$a_x$ = the permanent angular position of winding X (FIG. 4);

and $a_y$ = the permanent angular position of winding Y (FIG. 4).

To understand more clearly the relationships of $a_x$, $a_y$ and $\mu$, FIG. 4 can be drawn in vector coordinates as shown in FIG. 6. Locating zero degrees arbitrarily as shown, angles $a_x$ and $a_y$ are located to indicate an angular displacement of 120° relative to each other. Rotor angle $\mu$ may then assume any value within 360° of rotation. The sine wave relationship of equations 3 and 4 is readily derived from the vector relationships of FIG. 6 and is as shown in FIG. 5.

Amplitude factor $K$ of equations 3 and 4, above, is related directly to amplitude A of FIG. 5. Equations 1 and 2 further substantiate that the output of the integrators 10 and 11, FIG. 1, are indeed proportional to the output voltages X and Y of the synchro and differ only by the constant relationship of 2/w where w is the radian rate of the AC reference voltage. As will be seen subsequently, however, it is not necessary to know the value of $K$ in order to solve equations 3 and 4 for the synchro angle $\mu$. In fact, the independence of $\mu$ on $K$ is an essential feature of the invention and permits amplitude distortions occurring in output voltages X and Y to cancel in the computation for angle $\mu$. Amplitude factor $K$ then is understood to include the true synchro output voltage plus noise voltages and distortions which are common to both X and Y output voltages.

The calculation for angle $\mu$ is performed in the digital processor, in accordance with the trigonometric relationships of equations 3 and 4 and the known quantities of angles $a_x$ and $a_y$, as follows. First, equation 3 is multiplied by $\cos a_y$:

$$X \cos a_y = K \cos a_y \sin(\mu + a_x) \quad (5)$$

Expanding the sine of two angles of equation (5) yields:

$$X \cos a_y = K \cos a_y (\cos \mu \sin a_x + \sin \mu \cos a_x) \quad (6)$$

Multiplying out; then yields:

$$X \cos a_y = K(\cos \mu \cos a_y \sin a_x + \sin \mu \cos a_y \cos a_x) \quad (7)$$

Multiplying equation (4) by $\cos a_x$ yields:

$$Y \cos a_x = K(\cos \xi \cos a_x \sin a_y + \sin \xi \cos a_x \cos a_y) \quad (8)$$

Subtracting equation (6) from (5) yields:

$$X \cos a_y - Y \cos a_x = K \cos \mu (\cos a_y \sin a_x - \cos a_x \sin a_y) \quad (9)$$

In like manner a second equation can be developed which involves the sine of angles $a_x$ and $a_y$:

$$-X \sin a_y + Y \sin a_x = K \sin \mu (\sin a_x \cos a_y - \sin a_y \cos a_x) \quad (10)$$

Computation continues by squaring the right-hand side of equations (9) and (10) and, for convenience, each is equated to a term T:

$$(T_c)^2 = K^2 \sin^2 \mu (\sin a_x \cos a_y - \sin a_y \cos a_x)^2 \quad (12)$$

$$(T_s)^2 = K^2 \sin^2 \mu (\sin a_x \cos a_y - \sin a_y \cos a_x)^2$$

Adding equations (11) and (12) and taking the square root gives:

$$(T_c)^2 = K^2 \cos^2 \mu (\cos a_y \sin a_x - \cos a_x \sin a_y)^2 \cos a_x)^2]^{1/2} \quad (13)$$

Recognizing that $\sin^2 \mu + \cos^2 \mu = 1$, equation (13) reduces to:

$$(T_c^2 + T_s^2)^{1/2} = K(\cos a_y \sin a_x - \sin a_y \cos a_x) \quad (14)$$

Further multiplication of $T_c$ and $T_s$ respectively by $(T_c^2 + T_s^2)^{1/2}$ as a denominator gives the desired results:

$$T_c/(T_c^2 + T_s^2)^{1/2} = [K \cos \mu (\cos a_y \sin a_x - \cos a_x \sin a_y)]/AO[K(\cos a_y \sin a_x - \sin a_y \cos a_x)] = \cos \mu \quad (15)$$

$$T_s/(T_c^2 + T_s^2)^{1/2} = [K \sin \mu (\cos a_y \sin a_x - \cos a_x \sin a_y)]/AO[K(\cos a_y \sin a_x - \sin a_y \cos a_x)] = \sin \mu \quad (16)$$

The validity of solutions (15) and (16) follows from examining equations (9) and (10) where it is seen that there are only two unknowns, $\cos \mu$ and $\sin \mu$, all other terms are known, i.e. angles $a_x$ and $a_y$ are known and hence then trigonometric values and terms X and Y are measured by the circuitry of FIG. 1. Most significant in this derivation is the cancelation of amplitude term $K$ which appears in both the numerator and denominator of equations (15) and (16) and therefore divides out in the expressions.

It will be appreciated therefore that the digital processing equipment operates on the terms of the left side of the equations (9) and (10), then squares the resulting values in accordance with the equations (11) and (12). The square root of the sum of these squares then is produced as per equation (13) and the resulting value which then forms the denominator for equations (15) and (16). Equations (15) and (16) then yield $\cos \mu$ and $\sin \mu$, from either of which the rotor angular position may be determined. Although only one of these terms is necessary to define the rotor position, obvious advantages are available from deriving both thereof.

Figure 7:
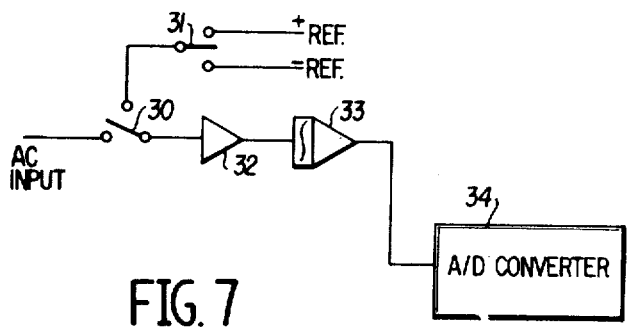
FIG. 7 details the amplifier calibration switching.

Calibration of the circuitry amplifier gain is accomplished as shown in FIG. 7. Periodically, i.e., interspersed infrequently with synchro output voltage processing, reference voltages of precisely known amplitude ( and shown in FIG. 7 as opposite polarity reference signals) are presented as input signals to amplifiers 7 and 8 in FIG. 1 by closing switches 30 and 31, in FIG. 7, this function is illustrated for a single signal channel of FIG. 1, including a switch 30, amplifier 32, integrator 33 and A10 converter 34 corresponding for example to switch 54A, amplifier 7, integrator 10 and A10 converter 21 A/D conversion is performed for each reference input to each channel of FIG. 1. The digital processor controls the calibration cycle and stores the measured amplifier gain for both X and Y voltage correction. The correction is applied, essentially, in equations (3) and (4) where $X_s$ and $Y_s$ are correspondingly increased or decreased in digital value to correct for any differences in circuit amplification. The digital processor applies straight line corrections according to:

$$y = ax + b \qquad (17)$$

where $a$ is equivalent to gain, $b$ is equivalent to a constant difference or offset and $x$ is the digital number presented by the A/D converter 34.

The multiplexer switches S1A, S1B, S3A, S3B of FIG. 1 permit time sharing of the A/D converter 21 and the holding register 22. The digital processor, in control of multiplexing, properly processes the switched inputs. Adjustments in accordance with periodic calibration by this technique operates to remove errors due to differences in input channels.

It will be understood that the system is operable with a greater or smaller number of synchro inputs than are shown. For example, it is operable with a single line synchro input although much of the error correction is lost — this, however, can be regained in substantial part by processing the AC reference excitation voltage as a further signal. Further, when a greater number of inputs is used, i.e. greater than one pair, the values may be scaled by the input scaling, or buffer, amplifiers to a common range, permitting use of an integrator with fixed gain. As well, switches S1A and S1B are to be understood as input multiplexing switches used to select a given pair of input amplifiers.

The integration time heretofore discussed in terms of one-half a cycle of AC reference frequency can be decreased if desired to increase the rate of conversion from analog amplitudes to digital numbers. Alternatives possible within the context of the invention include double integration on both half cycles of output voltages X and Y, thereby doubling the speed of conversion. This technique, however, requires use of two sets of integrators. A pair of analog sample and hold circuits multiplexed to the outputs of the integrators may be provided for each synchro input. The integrator may then cycle on the inputs so that the sample and hold circuits could be continuously refreshed, affording DC outputs voltages proportional to the input signals. The delay associated with the integration time, in association with the delay in attaining a zero crossing as in the disclosed systems then may be avoided. Finally, a pair of digital holding registers may be provided for each input from the synchro, which are continuously refreshed by each of the X and Y values as converted from analog. The processor thereby would have available at all times, for immediate processing, up-to-date data for any given input channel.

Numerous modifications and adaptations of the system and technique of the switches will be apparent to those skilled in the art, and thus it is intended by the appended claims to cover all such modifications and adaptations as fall within the true spirit and scope of the invention.

What is claimed is:

1. For use with a synchromechanism having a rotor winding energized by a reference excitation voltage and stator windings of known geometry, a system for determination of the rotor angular position comprising:
   means for deriving from the synchromechanism two related output voltages corresponding to voltages induced in two stator windings,
   means for sampling the output voltages to derive related samples of the form $X = K \sin(\mu + a_x)$ and $Y = K \sin(\mu + a_y)$ where $a_x$ and $a_y$ are the known, permanent angular relationships of the two stator windings relative to a reference, $\mu$ is the rotor angle relative to that same reference, and K is a common amplitude factor for the related samples, including noise and distortion voltage amplitudes common to the two related samples,
   means for processing the said related samples to determine the rotor angle $\mu$ in accordance with one of:

$$\cos \mu = T_c/(T_c^2 + T_s^2)^{1/2} \qquad (1)$$

and $$\sin \mu = T_s/(T_c^2 + T_s^2)^{1/2} \qquad (2)$$

where
$T_c = X \cos a_y - Y \cos a_x$, and
$T_s = -X \sin a_y + Y \sin a_x$
and wherein the factor $K$ is canceled and the effects of noise and distortion voltage amplitudes included in the factor $K$ correspondingly are eliminated from the value $\mu$ thus determined.

2. A system as recited in claim 1 further comprising:
   analog to digital converter means for digitizing the samples of the output voltages, and
   said processing means comprises a digital processor for receiving the digitized output voltage samples.

3. A system as recited in claim 2 further comprising:
   switching means selectively operable to alternately select said samples for supply to said analog to digital converter, and
   a holding register for receiving digitized samples from said analog to digital converter for supply of said related digitized samples to said digital processor, for processing.

4. A system as recited in claim 1 wherein said sampling means comprises:
   integration means responsive to the output voltages to develop integrated values for the said samples thereof over a predetermined integration interval, and
   means responsive to the period of the reference excitation voltage to establish the integration interval.

5. A system as recited in claim 4 wherein there is further provided switching means associated with said integration means and selectively operated by said means responsive to the period of the reference excitation voltage normally to disable said integration means and thereby clear the results of the integration function thereof for prior samples and selectively to enable the integration means to effect integration of the output voltages during each successive integration interval.

6. A system as recited in claim 4 wherein there exist plural sets of two related output voltages respectively corresponding to plural sets of related stator windings, and wherein:
   said integration means includes two individual integrators respectively receiving the two output voltages of each set thereof, and there is further provided:
   input multiplexing switches controlled by said processing means for selecting the related output voltages of each set, in succession, for supply to the respectively corresponding integrators.

7. A system as recited in claim 6 wherein there is further provided:
   switching means associated with said integrators,
   an analog to digital converter, said switching means being controlled by said processing means for alternately selecting said integrated voltage samples from said integrators for supply to said analog to digital converter, and a holding register for receiving the digitized and integrated voltage samples from said analog to digital converter to afford simultaneous supply of said related digital samples to said digital processor for processing thereby.

8. A system as recited in claim 4 wherein said means responsive to the period of the reference excitation voltage comprises a zero crossing detector.

9. A system as recited in claim 8 wherein said zero crossing detector is responsive to the reference excitation voltage to define the integration interval to coincide with a half cycle of the reference excitation voltage.

10. A system as recited in claim 4 wherein there is further provided scaling amplifiers for receiving and scaling said output voltages for supplying scaled voltages to said integration means of said sampling means in accordance with an acceptable input voltage range of said integration means.

11. A system as recited in claim 1 wherein there is further provided:

calibration means including a reference calibration voltage and selective switching means controlled by said processing means for periodically supplying the calibration voltage to said sampling means in lieu of said output voltages, and said processing means responds to the sample values derived from said periodic calibration voltages to correct for differences in amplification to which said output voltages from said stator windings are subjected prior to input to said processing means.

12. A method for determining the rotor angular position of a synchromechanism including stator windings of known geometry and wherein the rotor winding is energized with a reference excitation voltage, comprising:

selecting two output voltages from two selected stator windings, sampling the output voltages to derive related samples of the form $X = K \sin(\mu + a_x)$ and $Y = K \sin(\mu + a_y)$ where $a_x$ and $a_y$ are the known permanent angular relationships of the two stator windings relative to a reference, $\mu$ is the rotor angle relative to that same reference, and $K$ is a common amplitude factor for the related samples including common noise and distortion voltage amplitudes common to the two samples, processing the said related samples to determine the rotor angle $\mu$ in accordance with one of:

$$\cos \mu = T_c/(T_c^2 + T_s^2)^{1/2} \qquad (1)$$

and $$\sin \mu = T_s/(T_c^2 + T_s^2)^{1/2} \qquad (2)$$

where $T_c = X \cos a_y - Y \cos a_x$, and $T_s = -X \sin a_y + Y \sin a_x$ and wherein the factor $K$ is canceled and the effects of noise and distortion voltage amplitudes included in the factor K correspondingly are eliminated from the value $\mu$ thus determined.

13. The method of claim 12 wherein the sampling step further comprises integrating each of the input voltages over preselected, periodic time intervals as a function of the reference excitation voltage.

14. The method of claim 13 further comprising:

digitizing the integrated sample values for each integration interval, and processing the digitized values of said related samples.

15. The method of claim 14 further comprising:

alternately selecting the integrated sample values for each related set thereof for digitizing thereof by an analog to digital converter in a time shared relationship, and storing the digitized sample values of the related output samples for simultaneous processing thereof.

16. The method of claim 13 further comprising selecting the periodic integration intervals to correspond to successive half cycles of the reference excitation voltage.

* * * * *